(12) United States Patent
Meier et al.

(10) Patent No.: US 6,378,854 B2
(45) Date of Patent: Apr. 30, 2002

(54) METHODS FOR MANUFACTURING COILS AND APPARATUS FOR SAME

(75) Inventors: David A. Meier; Dean A. Pranger, both of Muskegon; Jerry Lee Wigren, Shelby; Ken Eugene Simons; Norman Edward Bradshaw, both of Muskegon; John R. Smith, Shelby; Russell D. Sugarbaker, North Muskegon, all of MI (US)

(73) Assignee: Precision Products Group, Muskegon, MI (US)

( * ) Notice: Subject to any disclaimer, the term of this patent is extended or adjusted under 35 U.S.C. 154(b) by 0 days.

(21) Appl. No.: 09/934,136

(22) Filed: Aug. 21, 2001

Related U.S. Application Data

(63) Continuation of application No. 09/798,645, filed on Mar. 1, 2001, which is a continuation of application No. 09/378,121, filed on Aug. 19, 1999, now Pat. No. 6,264,183.

(51) Int. Cl.[7] .................................................. F16F 1/06
(52) U.S. Cl. .................. 267/169; 29/606; 123/634; 72/135; 72/138
(58) Field of Search ................. 29/896.9, 607, 29/609, 605, 606, 791, 794; 123/634, 635, 169 PA; 267/166, 166.1, 167–169, 174, 179, 180; 72/127, 133, 135, 138, 137

(56) References Cited

U.S. PATENT DOCUMENTS

| | | | | |
|---|---|---|---|---|
| 3,030,056 A | * | 4/1962 | Rogers | 248/20 |
| 4,586,357 A | * | 5/1986 | Allweier et al. | 72/137 |
| 4,986,103 A | * | 1/1991 | Jacobson | 72/137 |
| 5,105,642 A | * | 4/1992 | Mohr | 72/137 |
| 5,343,614 A | * | 9/1994 | Betz et al. | 29/605 |
| 5,875,831 A | * | 3/1999 | Nohara et al. | 164/477 |

* cited by examiner

*Primary Examiner*—Pam Rodriguez
(74) *Attorney, Agent, or Firm*—Altheimer & Gray

(57) ABSTRACT

A spring assembly having a coil containing a core and methods and apparatus for manufacturing the same are disclosed. The coil includes a core between reduced portions of the coil. One device for manufacturing the coil includes a coiling machine having an insert device operable with a coiler. The coiler is programmed to form coils of appropriate diameter along the length of the coil, including a diameter sufficiently large to contain the core and two diameters sufficiently small to retain the core in the coil. The insert device transfers the core to the coil after the first small diameter is formed and before the second small diameter is formed. The coil with the core contained between the two small diameters is thereby manufactured in a unified automated process.

23 Claims, 9 Drawing Sheets

METHODS FOR MANUFACTURING COILS AND APPARATUS FOR SAME

CROSS REFERENCE TO RELATED APPLICATIONS

This application is a Continuation of U.S. patent application Ser. No. 09/798,645, filed Mar. 1, 2001, which is a Continuation of U.S. patent application Ser. No. 09/378,121, filed Aug. 19, 1999, now U.S. Pat. No. 6,264,183. Accordingly, this application claims the benefit of an earlier filing date under 35 U.S.C. § 120.

BACKGROUND OF THE INVENTION

The disclosure of U.S. patent application Ser. No. 09/378, 121, now U.S. Pat. No. 6,264,183, and U.S. Pat. No. 09,798,645 are incorporated herein by reference.

The present invention relates to coiling machines, although other uses will be apparent from the teachings disclosed herein. In particular, the present invention relates to coiled spring assemblies produced in a unified process. A specific embodiment of the coiled spring assemblies includes coiled ferrite spring assemblies which are of particular use in the automotive industry for reduction of electromagnetic interference (EMI) during ignition system firing.

Spring coiling machines are well known in the art. Spring coiling machines and methods are discussed in U.S. Pat. No. 5,036,690, entitled "Flexible Pipe End Crimping Apparatus," issued Aug. 6, 1991; U.S. Pat. No. 5,452,598, entitled "Automatic Spring Formation Apparatus," issued Sep. 26, 1995; and U.S. Pat. No. 5,791,184, entitled "Spring-Making Machine," issued Aug. 11, 1998. U.S. Pat. Nos. 5,036,690; 5,452,598; and 5,791,184 are incorporated herein, in their entirety, by reference. It is also known in the art to provide inserts in springs.

It has, however, been difficult to manufacture spring assemblies with plugs in a single continuous or unified process. Generally, the insert might be maintained in place by crimping the coils around the insert or inserting wire or flat stock about the ends of the coil to hold down the insert within the coil. These and other prior art methods for producing coiled plugs usually require inserting the plug into the coil after the coil is produced as a finished product. For example, the spring is manufactured, then in a separate process the cylinder is inserted into the spring (typically "by hand"). And then, in another separate process, the cylinder is secured in the spring by one of the aforementioned methods. These prior art methods involve multiple separate steps, often done by hand, and as a result have reliability and efficiency problems associated with them.

The present invention overcomes these problems and provides advantages heretofore unattainable.

SUMMARY OF THE INVENTION

The present invention relates to coiling machines and springs generally. It more particularly relates to machines and methods for manufacturing spring assemblies having a core inserted into the coil. The core may be one or more elements and the assemblies may have a variety of configurations. Accordingly, one object of the present invention is to provide a new and improved spring coiling machine.

Another object is to provide a consistent and reliable method of manufacture coiled spring assemblies at a reduced cost.

Another object of the present invention is to provide methods of manufacturing coiled spring assemblies in a unified manufacturing process.

Yet another object is to provide an improved spring assembly.

Another object of the present invention is to provide a continuous coiled spring assembly manufacturing process and apparatus for same.

Accordingly, one embodiment of the present invention is a coiling machine. The coiling machine includes a coiler adapted to form a coil having a first diameter and a second diameter. The second diameter is preferably smaller than the first diameter. Although not required for all applications, multiple diameters are preferred, including substantially equal (or uniform) multiple diameters. An insert device is positioned to insert a core into the coil, wherein the core has a core diameter between the first diameter and the second diameter, e.g. the core is smaller than the first diameter and larger than the second diameter. Thus, the core may be contained in one diameter (the first diameter) of the coil by another smaller diameter (the second diameter). Core as used herein (also referred to as a "plug") is intended to be broadly construed (as is "plug") to include any material and shape which may be inserted into the coil. Materials, including plastic and aluminum, are selected to meet specific application requirements, to reduce vibration or to achieve artificial solid height. Other applications will be apparent to those with skill in the art from the teachings disclosed herein.

Another coiling machine according to the present invention includes a coiler adapted to form a coil having a first diameter and a plurality of reduced portions. The plurality of reduced portions include a first reduced portion and a second reduced portion wherein the second reduced portion is located a spaced distance from the first reduced portion. An insert device is positioned to insert a core in the coil between the first and second reduced portions. The first diameter may be between the reduced portions or to either side of them. The insert device includes transfer structure to transfer the core from a first position to a second position. The second position is adjacent to the coil for some applications, though in general it need not be.

Accordingly, the present invention envisions a coil comprising a length, a major diameter (generally as part of the coil body) defining an interior, and a first reduced portion. The core is inserted into the interior and maintained in the interior by the reduced portion. Alternative methods eliminating the need for reduced portions are also provided. Use of a deformable core is one such method.

The present invention encompasses numerous methods of manufacturing coils, including spring assemblies having cores. One method includes the steps of forming a first diameter section and forming a first reduced portion. A core is inserted into the coil so as to be between the first reduced portion and a subsequently formed reduced portion.

One method of the present invention for manufacturing a spring assembly includes providing a continuous stream of wire to a coiler and providing a continuous stream of cores to an insert device positioned in the coiler. The wire is coiled into a first reduced portion and into a coil body (or coil core) having a diameter sufficiently large to contain the core. The core is inserted through (or into) the coil body up to the first reduced portion or there about.

The coil body is generally located mid-length of the coil and the coils are generally spaced closer together (along the length of the coil) in the coil body. Variations will be apparent to those with skill in the art.

Other objects and advantages of the present invention will be apparent from the following detailed discussion of exemplary embodiments with reference to the attached drawings and claims.

BRIEF DESCRIPTION OF THE DRAWINGS

FIG. 4 is rotated 180° from the view shown in FIG. 3.

FIG. 9a shows a section view of the spring assembly of FIG. 9 cut through section line 9a–9a.

DESCRIPTION OF EXEMPLARY EMBODIMENTS

Figure 2:
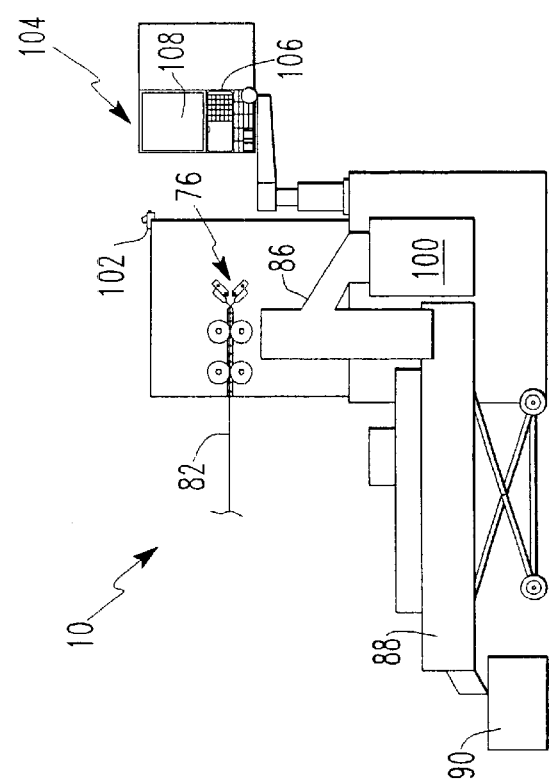
FIG. 2 shows an elevated front view of the coiling machine depicted in FIG. 1.

The present invention is discussed in relation to a coiler, and in particular, a wire coiler for forming a spring assembly having a core (or plug); other uses will be apparent from the teachings disclosed herein. The present invention will be best understood from the following detailed description of exemplary embodiments with reference to the attached drawings, wherein like reference numerals and characters refer to like parts, and by reference to the following claims.

Figure 1:
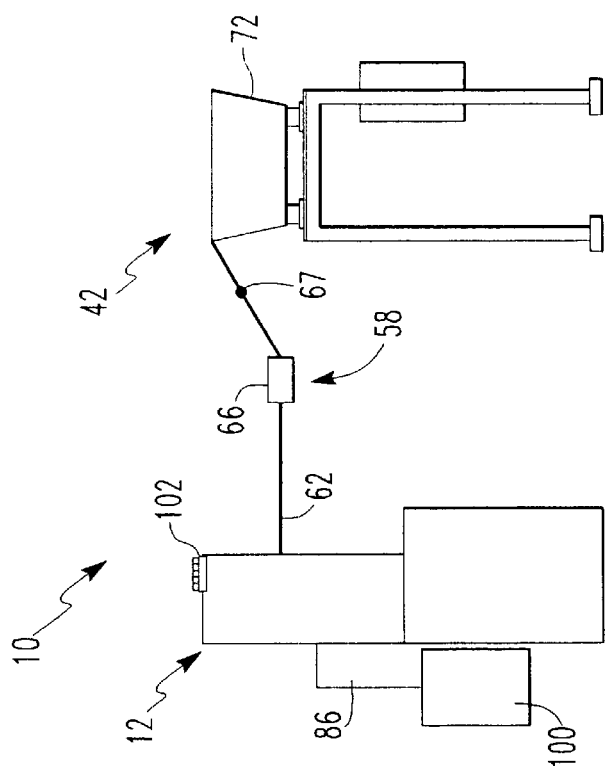
FIG. 1 shows an elevated side view of a coiling machine according to the present invention.
Figure 9:
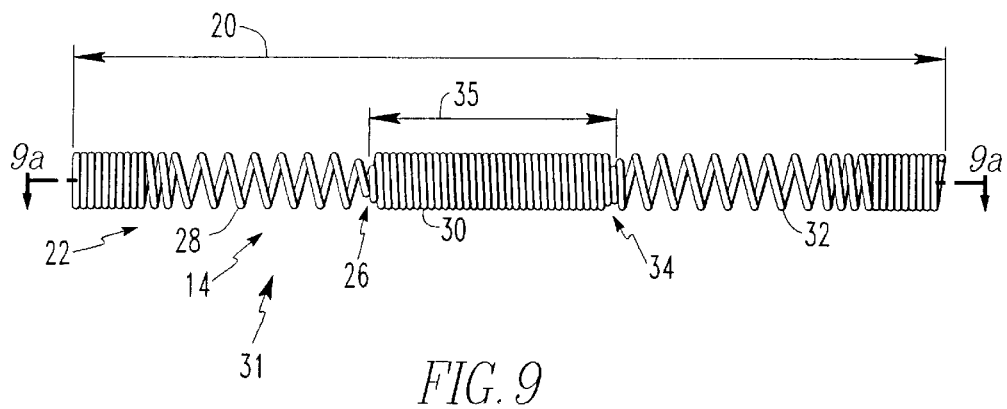
FIG. 9 shows an elevated side view of a coil having a plurality of diameters.

FIG. 1 depicts an elevated side view of a coiling machine 10 according to the present invention. The coiling machine 10 includes a coiler 12 adapted to form a coil 14 (see FIGS. 9 and 10), having a first diameter 16 and a second diameter 18, wherein the second diameter 18 is smaller than the first diameter 16. Referring to FIG. 9, the coil 14 comprises a length 20, a major diameter 22 defining an interior 24 (shown well in FIG. 10) and a first reduced portion 26. In the embodiment shown in FIGS. 9 and 10 the first reduced portion 26 is also referred to as the second diameter 18. The coil 14 shown in FIG. 9 includes a first diameter section 28, a first reduced portion 26 and a second diameter section 30; the second diameter section 30 is also referred to herein as a coil body diameter section (or simply coil body where appropriate). A third diameter section 32 is separated from the second diameter section 30 by a second reduced portion 34. One embodiment of the present invention is adapted from a ITAYA PC-15 available from A.I. Technology of Southfield, Michigan, ITAYA's U.S.A. Distributor. The ITAYA PC-15 includes the ability to manufacture springs of different diameters.

In one embodiment, the coil body diameter 30 has a maximum outside diameter of 8.43 mm; the interior diameter, preferably at each end of the coil 14, is 6.45 mm. A core 38 having a 6.35 mm diameter 40 is inserted into the coil body diameter 30 to form a spring assembly 31. To maintain the plug 38 in the coil body diameter 30, the reduced coil portions 26 and 34 are reduced to less than 6.35 mm diameter. In this embodiment the coil 14 has a length 20 of 106 mm and the plug 38 has a length 39 of 31.75 mm.

Though the invention is described in terms of "diameters," the invention is not limited to cylinders having circular cross sections. Diameter, and similar terms, are used herein for simplicity and should be construed broadly. For instance, diameter should include meanings such as elongated, elliptical, flattened, stretched, and the like. Further, the track, tube and insert device (discussed in more detail below) can be configured to coordinate with non-circular cross-section springs.

Figure 10:
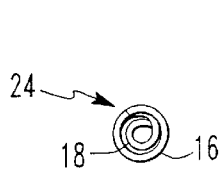
FIG. 10 shows an end view of the coil shown in FIG. 9. A first larger diameter and a second diameter are shown in the end view.
Figure 11:
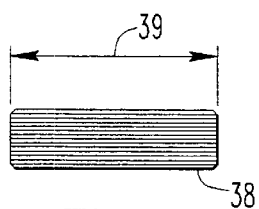
FIG. 11 shows an elevated side view of a core sized to fit within the coil shown in FIG. 9.
Figure 12:
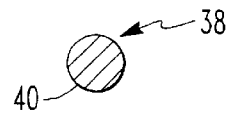
FIG. 12 shows an end view of the core shown in FIG. 11. The core has a diameter sufficiently small to fit within the coil shown in FIG. 9.

Coilers, similar to the coiler 12 shown in FIG. 1, are well known in the art and are programmable to form coils having a plurality of diameters such as shown in FIG. 9. The coiler is shown in FIG. 1, however, includes the improvements taught herein, such as insert devices, cams and pneumatic controls (air blasts and the like). The coiling machine 10 shown in FIG. 1 includes one such insert device 36 (shown in FIGS. 4, 5 and 6). The insert device 36 is positioned to insert a plug 38 into the coil 14. Referring to FIGS. 10 and 12, the plug 38 has a plug diameter 40 between the first diameter 16 and the second diameter 18, i.e. the measurement of plug diameter 40 is between the measurements of the first and second diameters 16 and 18. The plug 38 is insertable into a coil 14 having a first diameter 16 which is sufficiently large to contain the plug 38; the second diameter 18 is sufficiently small to maintain the plug 38 in the coil 14. The terms "plug" and "core" are used interchangeably, except where distinction is made, and are to be construed to generally include all insertable elements.

Figure 3:
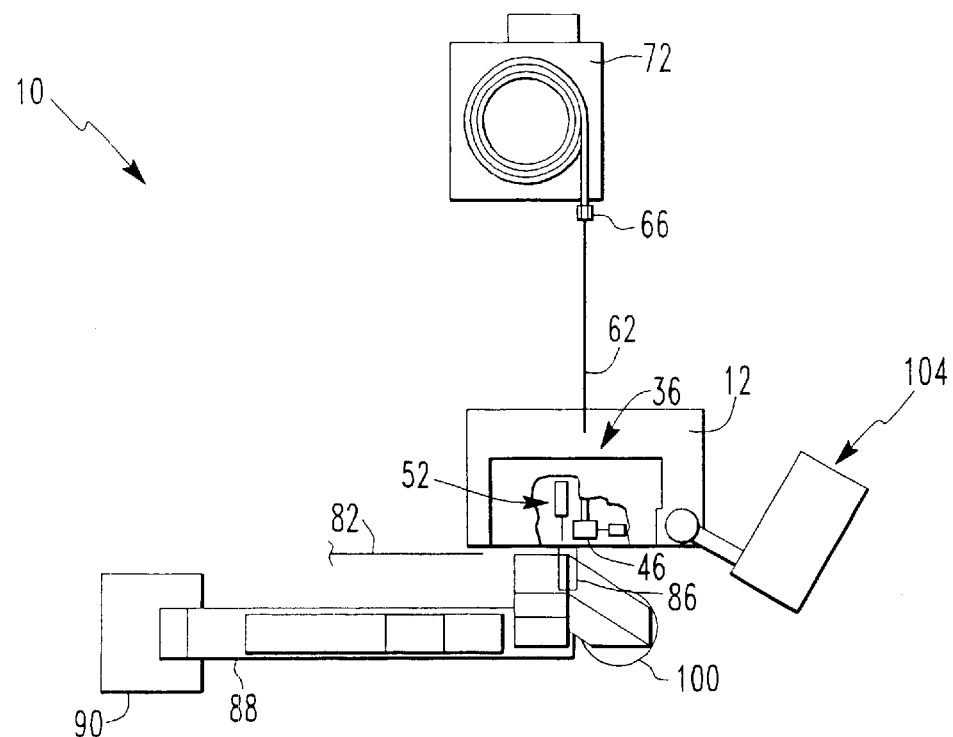
FIG. 3 shows a plan view of the coiling machine shown in FIG. 1.

FIG. 1 shows the feed structure 42 operably connected to the insert device 36 (shown in the coiler 12 cut out in FIG. 3.). FIGS. 2 and 3 are front and top views respectively of the coiling machine 10. The directions and orientations are provided for convenience only and not as limitations. Other feed structure embodiments within the scope of the invention will be apparent to those of skill.

Figure 4:
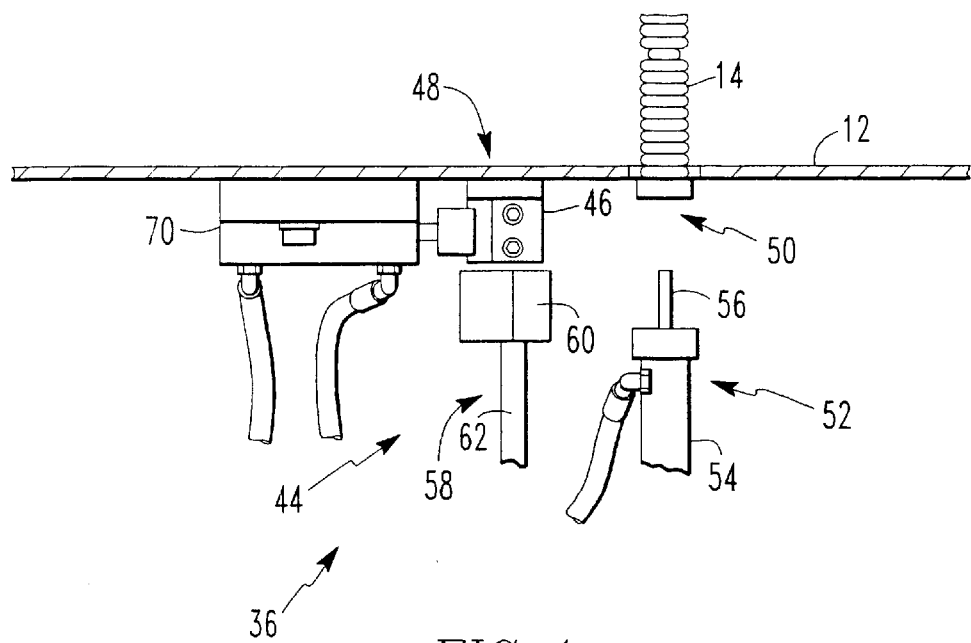
FIG. 4 shows a partial top view of transfer structure for transferring a core to a coil.

FIG. 4 shows a top view of an embodiment of the insert device 36, including transfer structure 44. The transfer structure 44 includes a transfer block 46 for transferring the plug 38 (not shown in FIG. 4) from a first position 48 to a second position 50 adjacent to the coil 14. The transfer structure 44 also includes a transfer element 52 positioned to transfer the plug 38 from the transfer block 46 to the coil 14.

Figure 8:
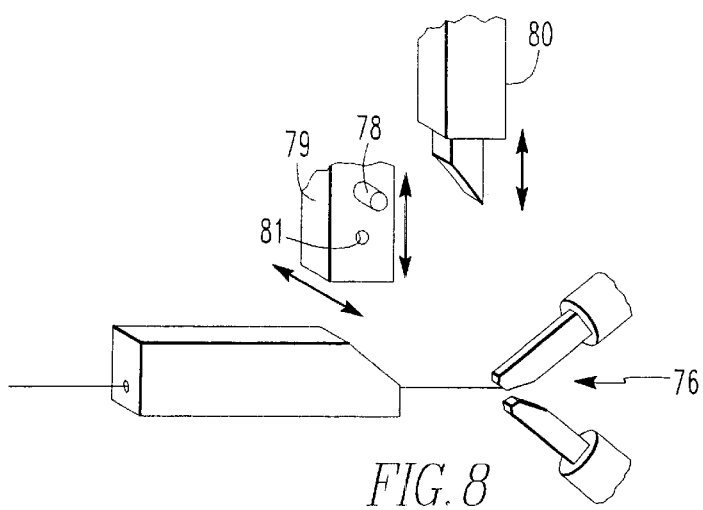
FIG. 8 shows a partial view of coiling points and a moveable arbor cutting block combination for cutting the wire.

In the embodiment shown in FIG. 4, the transfer element 52 includes an air cylinder 54 having a plunger 56. In one preferred embodiment the plunger 56 is positioned to be insertable into the coil 14. This is useful with semi-deformable cores. The plunger 56 movement is preferably coordinated with the movement of the coiling points 76 and the arm 79 shown in FIG. 8.

Figure 7:
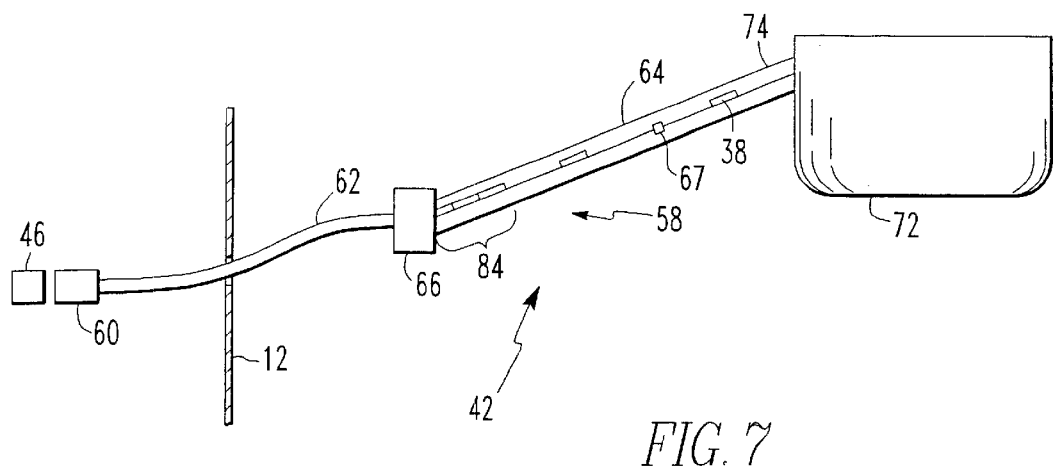
FIG. 7 is an elevated side view of a feed structure. Cores are shown staged on a track to be fed on demand by the feed mechanism through the feed tube to the transfer block.

Referring to FIGS. 1 and 4, the feed structure 42 comprises a conduit 58 having a first end 60 adjacent to the first position 48. FIG. 7 shows an embodiment of the conduit 58 including a feed tube 62 connected to a track 64 by a feed mechanism 66. The feed mechanism 66 may include a sensor 67 (or sensors) in (or on, and other operable orientations relative to) the track 64. The sensor for track 64 tells the vibratory feed bowl 72 when to start and stop. This guarantees cores are available for insertion. The sensor also may be used for other timing, detection, and coordination functions. Any one of a number of vibratory bowls available from multiple manufacturers will be suitable.

Figure 5:
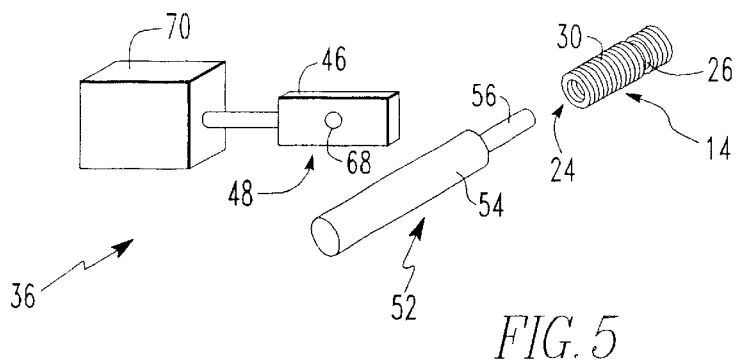
FIG. 5 shows a perspective view of the transfer structure with the feed tube remove or clarity. The transfer block is shown at a first position.
Figure 6:
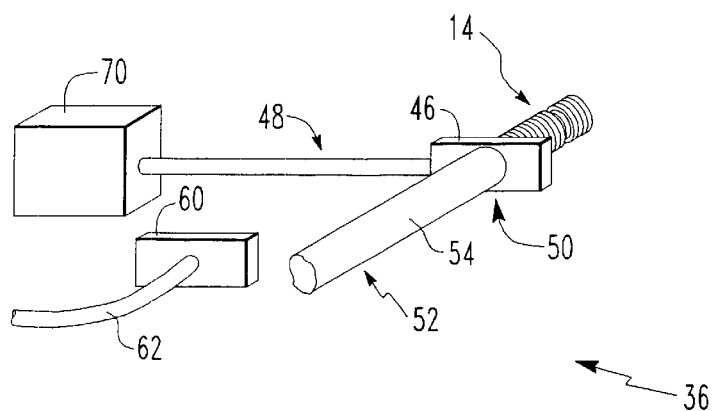
FIG. 6 is a perspective view of the transfer structure with the transfer block in a second post n adjacent to the coil.

FIGS. 5 and 6 show perspective views of the transfer mechanism 44. In FIG. 5, feed tube 62 has been removed to more clearly show the transfer block 46. The transfer block 46 includes a channel 68 for receiving the plug 38. In FIG. 5 the transfer block channel 68 is at the first position 48 for receiving the plug 38. In the embodiment shown in FIGS. 5 and 6 the transfer block 46 is laterally moveable. The transfer block 46 need not be air actuated, furthermore, other embodiments do not require the transfer block 46 at all. Computer controlled switches may be used to achieve precise timing control. FIG. 6 shows the transfer block 46 moved to the second position 50. The feed tube 62 is positioned to deliver the plug 38 to the first position 48. The air cylinder 54 is shown transferring the plug 38 from the transfer of block 46 to the coil 14.

The feed structure 42 shown in FIG. 7 includes a vibratory feed bowl 72. More generally, the vibratory feed bowl 72 may be a core source, or insert source, 72. The conduit 58 includes a second end 74 positioned to receive a plug 38 from the vibratory feed bowl 72. In one preferred embodiment the vibratory feed bowl 72 is used to singulate the cores 38, i.e. separate out a single core from a plurality of cores. For some applications, singulating includes aligning the cores end to end. The track 64 or the feed mechanism 66 may also be used to singulate the cores. In the embodiment shown in FIG. 7 the feed bowl 72 is positioned higher than the conduit first end 60. This positioning is one method of achieving gravity assisted feeding. The feed bowl 72 and the track 64 maybe used to orient the plug, or plugs, 38 and stage the plugs 38 for delivery to the transfer block 46. In one preferred embodiment the plugs 38 are staged at the feed mechanism 66 for delivery on demand to the transfer block 46 or the insert device 36 generally.

Figure 15:
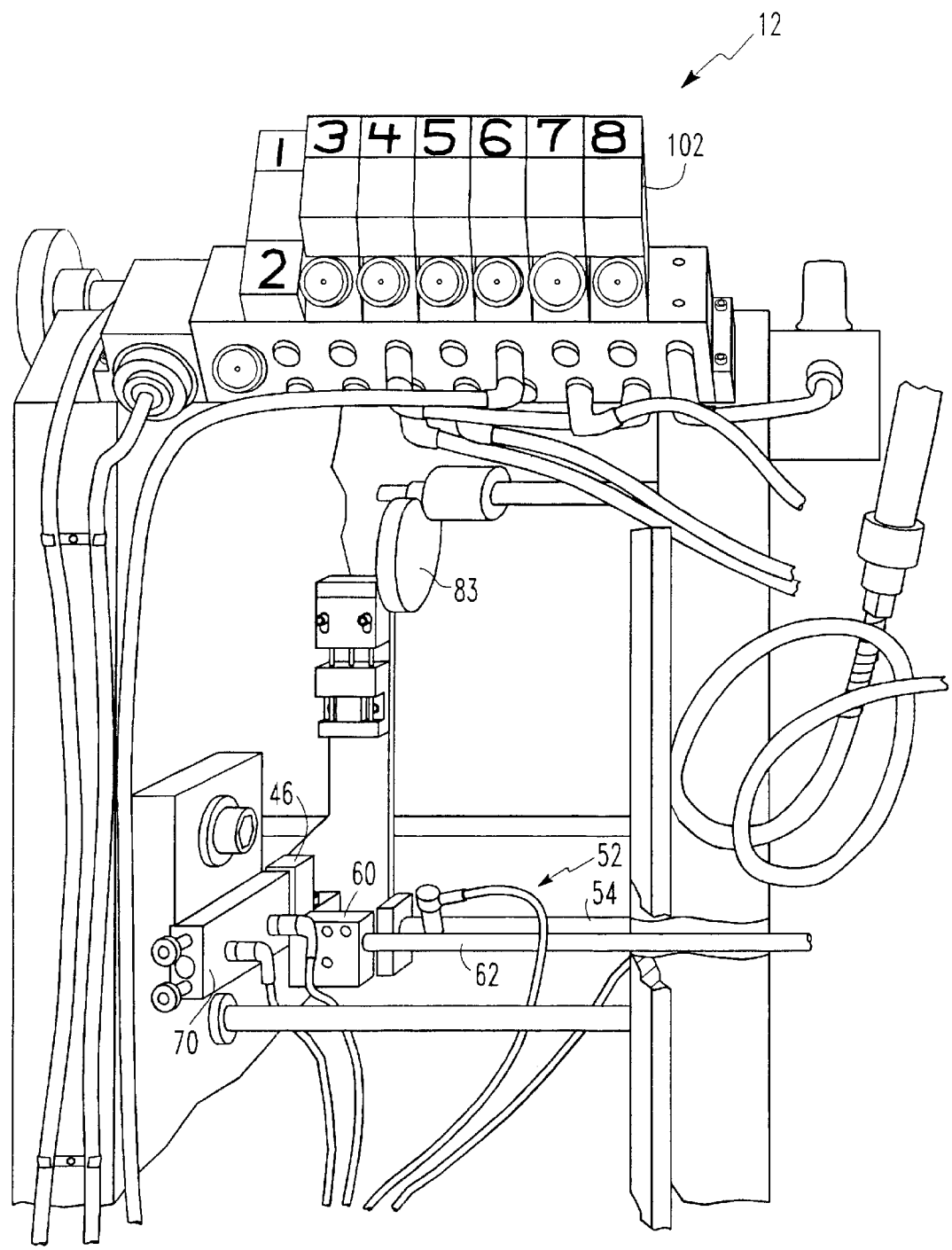
FIG. 15 shows a right side view of the coiling machine shown in FIG. 1.
Figure 16:
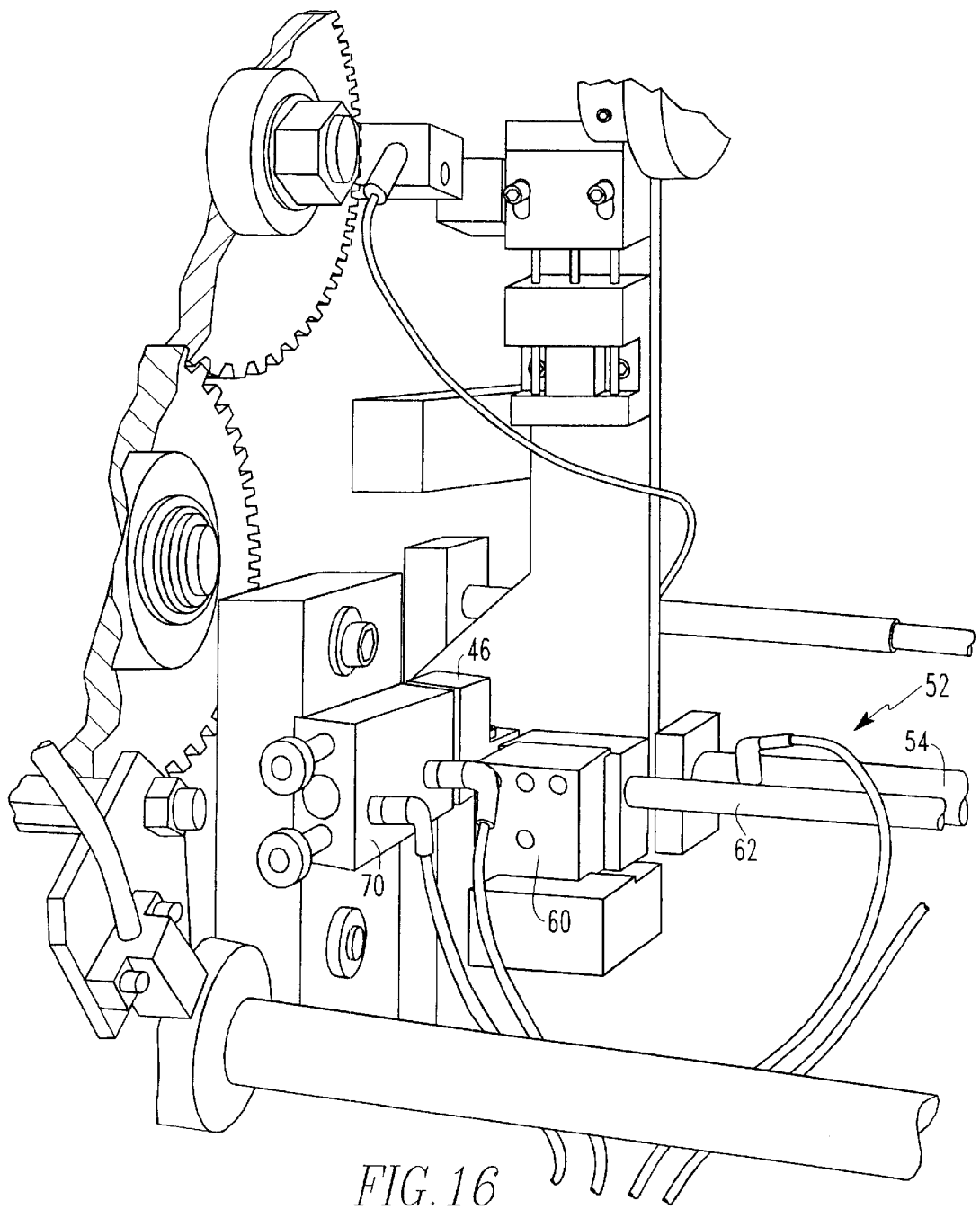
FIG. 16 shows a close up view of the interior of the coiling machine shown in FIG. 15. The transfer block is shown in a first position.
Figure 17:
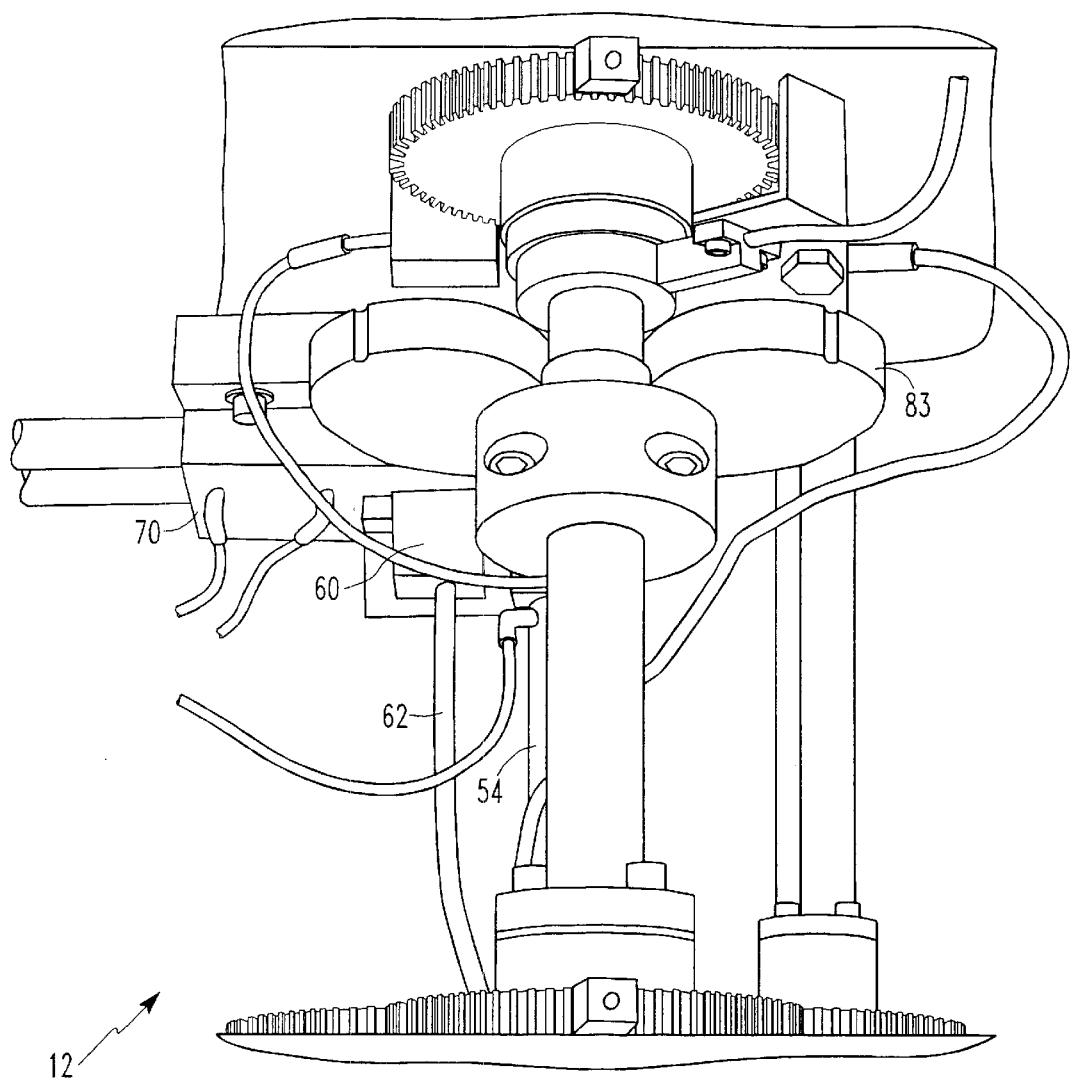
FIG. 17 is a top view looking into the interior of the coiling machine 12.
Figure 18:
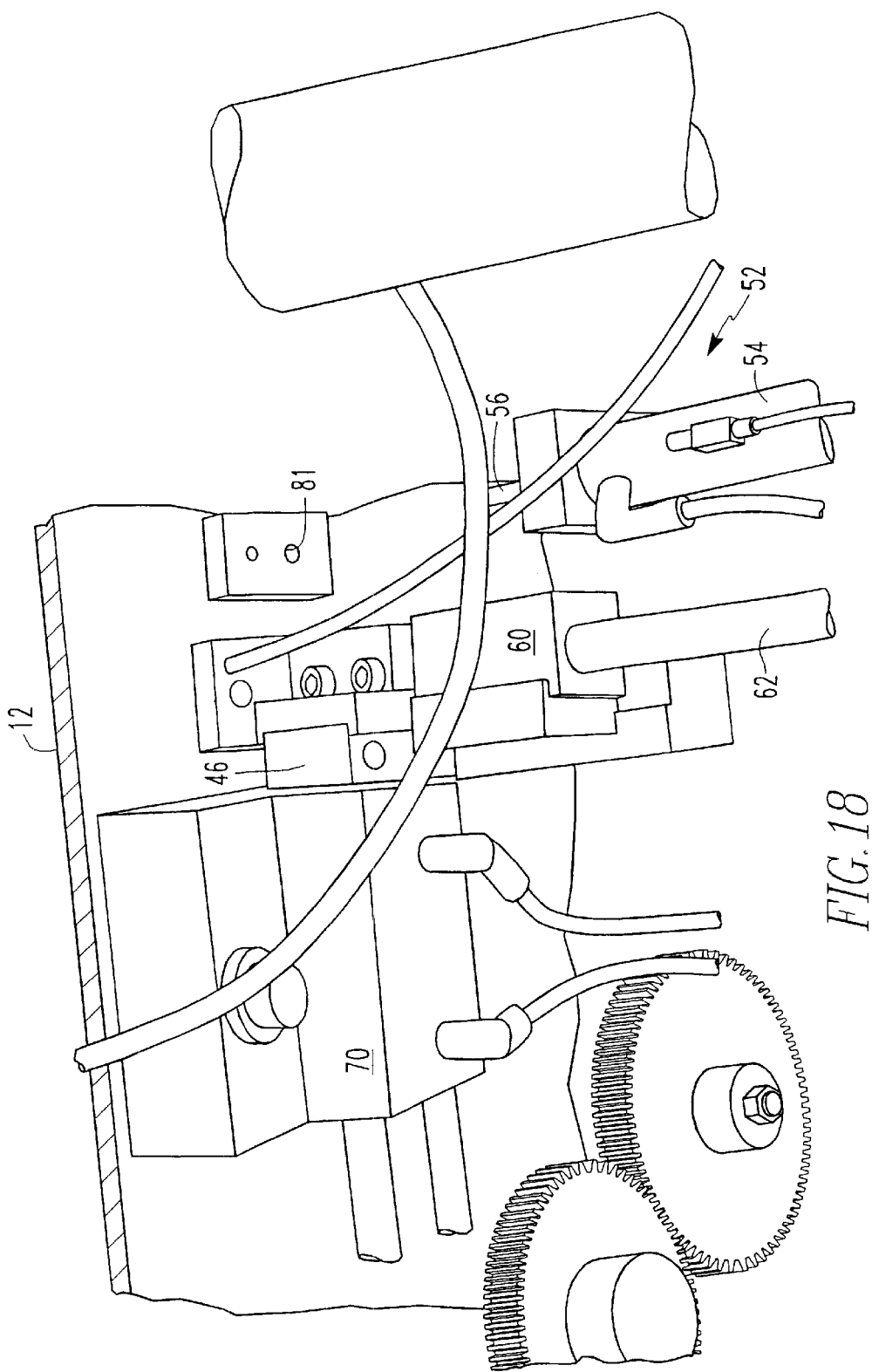
FIG. 18 is similar to the view shown in FIG. 17; the cam shaft, however, is removed for clarity.

FIGS. 15 through 18 show close-ups of the interior of the coiler 12. FIG. 15 is a right side view of the coiler 12 showing the interior. FIG. 16 is an enlarged view of FIG. 15, the transfer block 46 is shown adjacent to the conduit first end 60. Transfer element 52 is shown adjacent to and generally parallel with the feed tube 62. After the transfer block moves the core 38 from the first position 48 to the second position 50, the air cylinder 54 would then transfer the core 38 through hole 81. FIGS. 17 and 18 are top views looking into the coiler 12; FIG. 18 shows hole 81 from inside the machine.

Figure 9A:
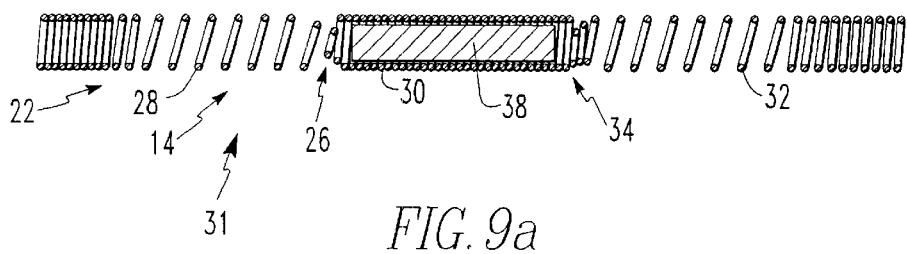

In one method of the invention, the coiler 12 produces the first reduced portion 26 of the coil 14 (spring 14) and begins, and preferably completes, the coil body diameter 30 while the plug 38 is oriented, staged and transferred to the transfer block 46. Variations of this approach will be apparent from the teachings herein. The coiler 12 produces a second reduced portion 34 located a spaced distance 35 from the first reduced portion 26 wherein the spaced distance 35 is sufficiently long to contain the plug 38 in the coil 14. The spaced distance 35 may be sized to contain a multiplicity of plugs. The major diameter 22 shown in FIG. 9 is substantially uniform, i.e. the diameters 28, 30 and 32 are substantially equal. FIG. 9a shows a cross-section of the spring assembly 31 shown in FIG. 9 through section lines 9a—9a. The core 38 is shown positioned in the coil 14.

Another method of manufacturing the spring assembly 31 includes the steps of forming a first diameter section 28 and forming a first reduced portion 26. A core 38 is inserted into a coil 14. Generally, the first reduced portion 26 is formed before the core 38 is inserted into the coil 14. In a preferred embodiment a coil body 30 is formed, then the core 38 is inserted into the coil 14; a second reduced portion 34 is then formed after the core 38 is inserted into the coil 14. This maintains the core 38 in position between the first reduced portion 26 and the second reduced portion 34. Coiling points 76, shown in FIG. 8, preferably form a second diameter section 30 after forming the first reduced portion 26. In one method the first diameter section 28 has been formed before the first reduced portion 26 is formed and before the core 38 is inserted into the second diameter section 30. Thus, describing the coil length-wise, the coil has a first diameter, then a reduced portion, then a second diameter. The plug is then inserted into the second diameter behind the reduced portion. Another diameter is formed behind the reduced portion.

Figure 13:
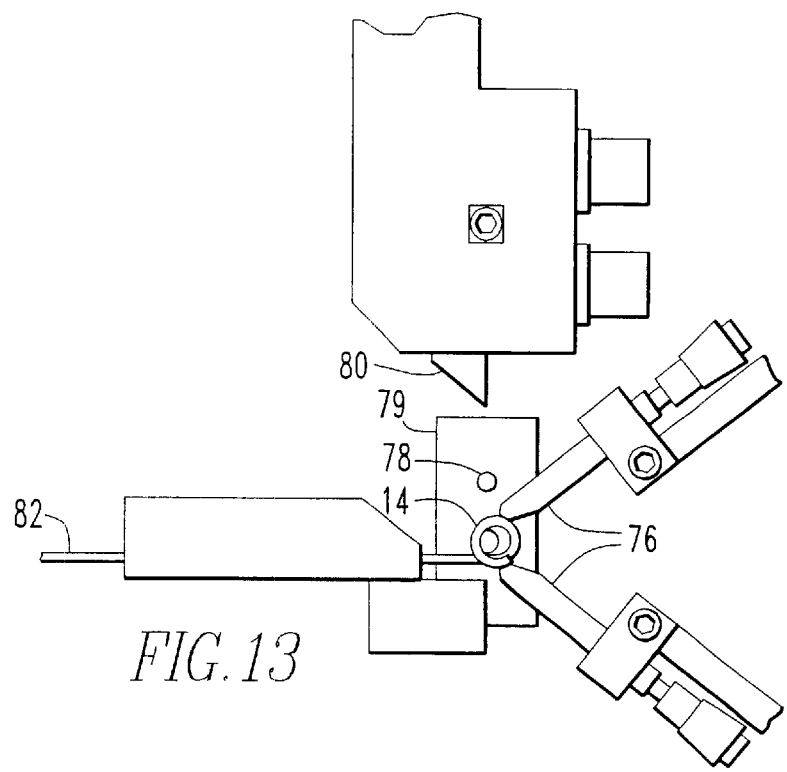
FIG. 13 shows a front close-up view of the coiling points. The wire is being continuously fed to the coiling points.
Figure 14:
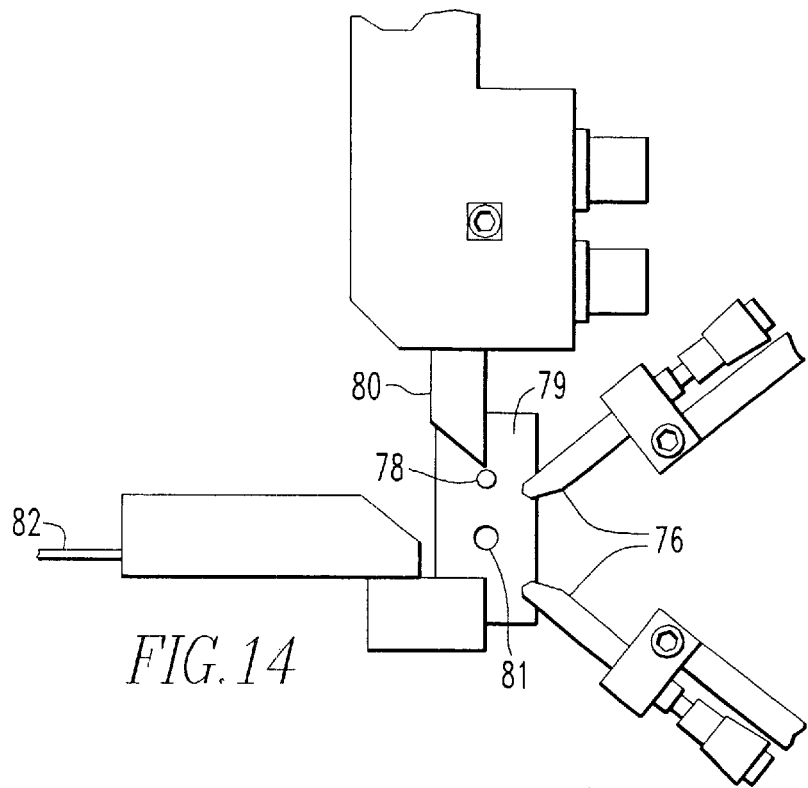
FIG. 14 shows the coiling points of FIGS. 13 in a withdrawn position.

Coiling may be stopped (but need not be) prior to inserting the core 38. The stopping of coiling may result in a more consistent final part. The coiling points 76 are withdrawn, or backed off when coiling is stopped, as shown in FIG. 14 which should be compared with FIG. 13 in which the points 76 are in coiling position. Withdrawing the coiling points facilitates insertion of the core 38 (and plunger 56) in the coil 14. Arm 79 is positioned to align hole 81 with the coil 14. Wire 82 is continuously fed from a wire payout (not shown) to the coiling points 76. The coiling points 76 are generally moved in and out according to preprogrammed computer instructions.

An arbor 78 is moved up and down by a cam 83, shown best in FIGS. 15 and 17.

The arbor is up (see FIG. 13) except when cutting, and then the cutting block 80 comes down across the arbor to cut the wire at predetermined lengths or intervals to produce spring assemblies of predetermined lengths 20. In a preferred embodiment the arbor 78 is on the same block (arm) 79 through which the core 38 is inserted. The core 38 is inserted into coil 14 through hole 81. Generally after the plug 38 has been inserted into the coil 14, coiling will resume to either complete the core body 30 or to form a reduced section 34 which maintains the core 38 in the coil 14. It may be preferable to back the plunger 56 out of the coil 14 prior to resuming coiling. This allows the coiling points to reduce subsequent coil portions for core retention.

Those who have skill in the art will understand that the coiler 12 may perform standard coiling processes and variations thereof in addition to the inventive features taught herein. Accordingly, the core 38 may be positioned when the coiler has reached a predetermined point in the coiling process, or cycle. The track 64, or the feed mechanism 66, or other devices known to those with skill in the art, may be used to stage the core 38 until that point in the cycle.

One preferred method of manufacturing the spring assembly 31 comprises the steps of providing a continuous stream of wire 82 to a coiler 12. A continuous stream of plugs 84 is provided to an insert device 36 positioned in the coiler 12. The wire 82 is coiled into a first reduced portion 26. The core 38 is inserted behind the first reduced portion 26. A coil body 30 is formed from the wire 82, wherein the body 30 has a diameter 18 sufficiently large to contain the core 38. In the embodiment shown in FIGS. 1 and 6, the core 38 is inserted behind the first reduced diameter 26. The wire 82 is coiled into a second reduced diameter 34 behind the core 38. One preferred method includes singulating the cores prior to transferring the cores to the second position 50, other methods will be apparent to those of skill in the art from the teachings disclosed herein.

One unified method of manufacturing spring assemblies 31 includes inserting a core 38 at a predetermined point in the coiling process, wherein the predetermined point in the coiling process is after and before the first and second reduced coil portions, respectively, are formed. It will be apparent that multiple plugs 38 may be inserted into the spring 14. The plugs 38 may be separated by empty or filled coiled sections. Since, the arbor 78 cuts the spring 14 into a predetermined length, a variety of spring assembly 31 configurations may be manufactured according to the present invention. A control panel 104 having input means 106 and visual output means 108 may be used to program, monitor, track and adjust the process. The core installation process may be carried out with mechanical switching and cams in conjunction with, or as an alternative to, a computer automated process.

A sorter 86 is operably positioned to sort the spring assemblies 31 into good product and scrap. See FIG. 1–3. The good product passes through a stress relief oven 88 placed in line. The stress relief oven 88 relieves stresses formed by cold coiling the wire 82. Good product leaving the stress relief oven 88 is accumulated in part/product receptacle 90. The low, or sub-standard, quality springs and spring assemblies are sorted into scrap receptacle 100. A detector above a discharge chute (not shown) detects whether a sub-standard spring assembly 31 will be ejected as a rejected part. Detectors are not required for most applications.

A pneumatic switch pack 102 is operably positioned to supply air to run the actuators, move the core through the system and to blow the finished part off the machine. Part ejection from machine tooling is also often accomplished via an air blast. Switching is generally controlled by the coiling machine computer. Firing sequences and operation timings are thus precisely controlled.

Cores may be selected to meet specific applications. For example the spring assemblies may be used to dampen vibrations as compared to standard coils. Neoprene, or malleable rubber (such as used in compressible ear plugs) are suitable for some applications, while rigid cores are more appropriate for other applications. In particular applications the core 38 is a sound damper. The sound damper may be adapted to dampen electromagnetic energy generally and electrical (RF) specifically; audible sounds, i.e. with the range of human hearing may be dampened as well. A ferrite core may be used to shift the radio frequency. Accordingly, the material from which the core is made may be optimized for specific applications. The cores may also be of both general and specific materials. Reduction of coil material weight may be achieved by creating a false solid height.

It will also be apparent from the foregoing that the term "wire" is not limited to metallic material or filaments. Specifically, the wire material and the core material may be selected to achieve a desired interaction (or lack of interaction) between the two. Tubular wires (coils) maybe filled with a desired gas to achieve a desired thermodynamic result as a result of the wire-core interaction.

More generally, the spring assembly 31 comprises a coil 14 having an interior 24 and a core 38 inserted into the coil interior 24. The core 38 sufficiently contacts the coil 14 to be maintained in the coil interior 24. In one preferred embodiment the core 38 is deformable. This allows the core to have an outer diameter 40 at least as large as the coil interior 24. The core 38 should be sufficiently deformable to be inserted into the coil interior 24. When the core 38 expands from a deformed state to a non-deformed state, the coil 14 forms an interference fit, for example, in the coil interior 24 with the core 38. More specifically the core outer diameter is preferably at least as large as the coil inner diameter. Although not required, the core 38 should have sufficient lubricity (that is lubrication, slipperiness, and the like) to be inserted into the coil interior 24. The coil 14 may impart a compressive diametric force to the core 38 to maintain the core 38 in the coil interior 24. This is particularly the case when the core expands from the deformed state.

Thus, although there have been described particular embodiments of the present invention of a new and useful coiling machine and method of coiling, it is not intended that such references be construed as limitations upon the scope of this invention except as set forth in the following claims.

The invention claimed is:

1. A coiling machine comprising:
   a coiler adapted to form a coil having a first diameter and a second diameter, wherein the second diameter is smaller than the first diameter; and
   an insert device positioned to insert a core into the coil wherein the core has a core diameter between the first diameter and the second diameter.

2. The coiling machine of claim 1, wherein the insert device comprises transfer structure including:
   a transfer block for transferring the core from a first position to a second position adjacent the coil; and
   a transfer element positioned to transfer the core from the transfer block to the coil.

3. The coiling machine of claim 2, wherein the transfer block is movable.

4. The coiling machine of claim 3, wherein the transfer block is air actuated.

5. The coiling machine of claim 2, wherein the transfer element is a plunger adjacent the second position.

6. The coiling machine of claim 5, wherein the transfer element is an air cylinder having said plunger positioned to be insertable into the coil.

7. The coiling machine of claim 2, further comprising feed structure positioned to feed the core to the transfer block at the first position.

8. The coiling machine of claim 7, wherein the transfer block is movable between the first position and the second position.

9. The coiling machine of claim 8, wherein the feed structure comprises a conduit having a first end adjacent the first position.

10. The coiling machine of claim 9, wherein the feed structure includes a vibratory feed bowl and the conduit includes a second end positioned to receive the core from the vibratory feed bowl.

11. The coiling machine of claim 9, wherein the conduit includes a feed tube including the first end and a track connected to the feed tube.

12. The coiling machine of claim 11, wherein the feed structure comprises a feed mechanism connecting the track to the feed tube.

13. The coiling machine of claim 1, further comprising feed structure positioned to feed the core to the insert device.

14. The coiling machine of claim 13, wherein the feed structure including:
  a vibratory feed bowl; and
  a conduit having a first end positioned to feed the core to the insert device and a second end positioned to receive the core from the vibratory feed bowl.

15. The coiling machine of claim 14, wherein the vibratory feed bowl is positioned higher than the conduit first end.

16. The coiling machine of claim 13, wherein the feed structure comprises orienting and staging means for staging and orienting the core for delivery to the insert device.

17. The coiling machine of claim 1, wherein the core is a sound dampener.

18. A coiling machine comprising:
  a coiler adapted to form a coil having a first diameter and a plurality of reduced portions of lesser diameter than the first diameter, the plurality of reduced portions including a first reduced portion and a second reduced portion located a spaced distance from the first reduced portion; and
  an insert device positioned to insert a core in the coil between the first and second reduced portions.

19. The coiling machine of claim 18, wherein the insert device comprises a transfer block movable from a first position to a second position to transfer the core from the first position to the second position, wherein the second position is adjacent to the coil.

20. The coiling machine of claim 19, wherein the insert device further comprises a transfer element positioned to insert the core into the coil from the second position.

21. The coiling machine of claim 20, wherein the transfer element is a plunger.

22. The coiling machine of claim 18, wherein the insert device comprises a transfer element positioned to insert the core into the coil.

23. The coiling machine of claim 18, further comprising a core source including a vibratory bowl connected to the insert device.

* * * * *